March 13, 1956   D. W. MEANOR ET AL   2,737,998
APPARATUS FOR MANUFACTURING RODS, TUBES, AND THE LIKE
Filed Nov. 3, 1952
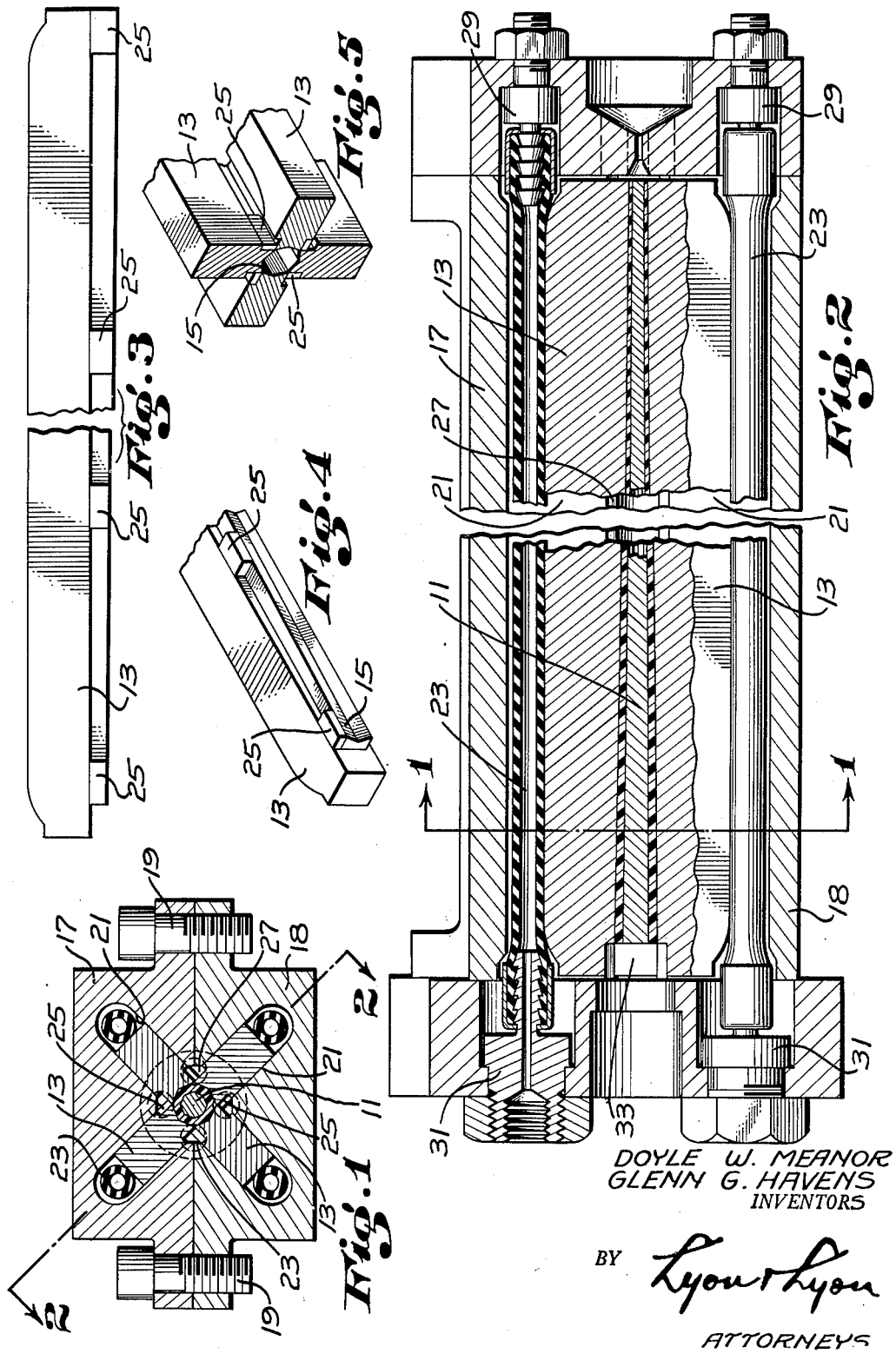
DOYLE W. MEANOR
GLENN G. HAVENS
INVENTORS
BY *Lyon & Lyon*
ATTORNEYS

United States Patent Office 2,737,998
Patented Mar. 13, 1956

2,737,998

APPARATUS FOR MANUFACTURING RODS, TUBES, AND THE LIKE

Doyle W. Meanor and Glenn G. Havens, San Diego, Calif., assignors to Narmco, Inc., San Diego, Calif., a corporation of California Application November 3, 1952, Serial No. 318,366

8 Claims. (Cl. 154—1.8)

This invention relates to an improved method and apparatus for manufacturing rods or tubes of cylindrical or polygonal cross section, or other solid or hollow bodies composed of convolutely wrapped layers of fibrous material reinforced with a resinous binder.

In the conventional construction of fishing rods or the like, the customary fabrication procedure employs high strength materials, such as a glass fiber fabric impregnated with a suitable resin compound which is adapted to be hardened by the influence of heat and pressure or other curing means. The impregnated material is customarily wrapped about a suitable mandrel and the assembly subjected to the influence of elevated temperatures to set or cure the resinous impregnating material. If a hollow tube is desired the mandrel may then be removed.

In addition, while the wrapped mandrel is being heated, it is conventional practice to subject the same to pressure in order to produce a flowing of the resinous material. This flow is necessary in order to insure a complete saturation of all voids which may exist in and about the interstices of the fabric, and in order to securely bond the contiguous surfaces of the fabric layers. When the proper pressures and temperatures have been employed the cured material is characterized by a hard smooth surface. The present invention relates to an improved method and apparatus for applying this desired pressure to the wrapped mandrel during the curing operation.

In the application of heat and pressure it is highly imperative that such application be uniform and constant. That is, heat must be provided equally about the periphery of the wrapped mandrel mainly to prevent warpage of the cured rod. It is evident that if parts of the wrapped mandrel are at different temperatures than the rest of the wrapped mandrel that residual stresses set up by the differing thermal expansion will cause the cured rod to be misshapen and warped. In addition, pressure must be applied to the wrapped mandrel equally over substantially the entire periphery in order to produce a cured rod of uniform cross section. Unequal pressure will produce an undesirable out of round or distorted cross section.

In accordance with the present invention, a novel method and apparatus is employed whereby these difficulties are substantially eliminated. Thus, the wrapped mandrel is positioned within a plurality of pressure keys. These keys extend longitudinally of the wrapped mandrel with their bearing faces against said mandrel, and are uniformly disposed about the periphery of said mandrel. Each key face provides the requisite pressure for a portion of the rod, and the combination of all the keys provides pressure for the complete periphery of the wrapped mandrel. Each key is actuated individually by a common pressure means and said pressure means are adapted to provide substantially identical pressure to each key. Thus, a uniform pressure is exerted over the entire surface of the wrapped mandrel. In addition, it can be seen that the shape of the bearing faces of the keys can be made to impart almost any shape desired to the outer surface of the wrapped mandrel.

Accordingly, it is an object of the present invention to provide an improved process for manufacturing rods, tubes or the like, composed of convolutely wrapped layers of fibrous material reinforced with a resinous binder.

It is a further object of the invention to provide an improved curing fixture for use in such process.

It is an additional object of the invention to provide an improved curing fixture to produce rods, tubes or the like having a polygonal cross section.

Other objects and advantages of the invention will become apparent by reference to the detailed description hereinafter given and to the drawings in which like numerals are employed to designate like parts throughout the same.

In the drawings:

Figure 1 is an end view in section of a curing fixture embodying this invention.

Figure 2 is a section taken along the line 2—2 of Figure 1.

Figure 3 is a side elevation of one of the pressure keys.

Figure 4 is a perspective view of a portion of one of the pressure keys.

Figure 5 is a fragmentary perspective illustrating the pressure keys in the closed position.

In the drawings, wherein for the purpose of illustration is shown a preferred embodiment of the present invention, and in which a tube of octagonal cross section is produced, the numeral 11 designates a wrapped mandrel, formed by wrapping glass fabric, or similar material which has been impregnated with a suitable thermosetting resin, about a mandrel. The mandrel may be tapered, as shown, or of uniform diameter, if desired, and serves to form either a permanent core or a hollow interior section in the finished rod. In the latter case, the mandrel is removed after curing, as will be described hereinafter. While various types of material may be used, that which has been found preferable is a glass fabric in which the yarns of the fabric extend principally in a longitudinal direction relative to the mandrel. The fabric is square woven with the weft yarns substantially less in strength than the warp yarns. A specific example of a preferred fabric, but not by way of limitation, is a glass fabric having a thickness of 0.009 inch and an area of 1.8 square yards per pound. Such a fabric includes warp cords of 225–3/2 construction spaced about 25 ends per inch, and weft or fill cords of 450–1/2 construction spaced about 28 ends per inch. This fabric is known in the market today as "Fiberglas," and is a commercially available product of the Owens-Corning Fiberglas Corporation.

The preferred resinous materials used to coat and impregnate the glass fabric and for bonding the fabric to form an integral composite rod of high strength-to-weight ratio are thermosetting "plastics," for example, phenol formaldehyde or partially polymerized phenol formaldehyde. Such materials are generally available and well known in the art, as are methods of coating and impregnation of the fabric. For this reason, detailed description thereof is deemed unnecessary.

The mandrel is preferably made of metal, but wood or other materials well known in the art may be used. In addition, the mandrel may be circular in cross section, as shown, or it may be of a cross section approximating that of the perimeter of the cured tube. If a hollow rod is desired, the mandrel may be first coated or treated with a suitable parting agent before wrapping the fabric about it in order to facilitate later removal of the mandrel. Various parting agents, such as silicone greases or waxes, are well known in the art, and need not, therefore, be described herein in detail. If desired, the mandrel may be coated or made of a material which itself functions as a parting agent due to its waxy non-adhesive nature. An example of such a material is poly-tetrafluoroethylene, known in the market by the trademark "Teflon," and which is a commercially available product of the E. I. du Pont de Nemours & Co. (Inc.).

After application of the parting agent, and after wrapping the mandrel with the fabric, the wrapped mandrel must be cured under the proper combination of temperature and pressure to polymerize the resin. Holding the wrapped mandrel at a temperature of approximately 300° F. for approximately thirty minutes has been found to be most suitable, although somewhat lower temperatures for a longer period or higher temperatures for a shorter period are almost equally satisfactory. Of course, the curing cycle will vary with the type of resin used, the data here being applicable to a phenol formaldehyde type resin. The cure is obtained by any of the conventional curing methods, that is, ovens, radiant heating lamps, catalysts, di-electric heating units, or others.

To create the necessary pressure according to the present invention, pressure keys 13, Figure 1, are provided. Within these keys a wrapped mandrel 11 is positioned so as to bear against the inward faces of said keys. These inward bearing faces 15 are adapted to shape the fabric wrapped about the mandrel into the particular form desired. For purposes of illustration, a description of the shaping of the fabric into an octagonal shape will be described.

Thus, the bearing faces 15 will be adapted to impart an octagonal shape to the wrapped fabric. Although the use of eight keys, each forming one side of the octagonal form, is entirely feasible, in the preferred embodiment of the present invention a compound face is utilized. That is, an angular bearing face 15 is provided so that each face will form two sides of the octagon, making the use of only four keys necessary to form the octagon, Figure 1.

In the formation of rods or tubes of uniform and constant cross section the wrapped mandrel and the pressure keys 13 will also be of uniform and constant cross section. However, in the embodiment herein described, a tapered rod or tube is produced. Therefore, as seen in Figure 2, the pressure keys 13 are tapered longitudinally, the proportions of the bearing faces 15 diminishing from one end of the wrapped mandrel 11 to the other end of said mandrel. In addition, said mandrel is also longitudinally tapered in conformity with the taper of said faces 15.

A two-part housing 17 and 18 rigidly secured together by bolts 19, is provided with a number of longitudinal keyways 21 to position and slidably support an equal number of pressure keys 13, as shown in Figure 1. Under the influence of some pressure means, said keys slide radially inwardly and outwardly in keyways 21. Various pressure means may be utilized, including pneumatic, hydraulic, or electro-mechanical means. In the preferred embodiment of the present invention pneumatic means are employed. Hollow elastic tubes 23, made of rubber or similar materials having elastomeric properties, capable of retaining this property under the desired temperature conditions, are positioned within keyways 21 and outwardly of pressure keys 13. As tubes 23 are air inflated through a suitable master pressure control valve common to all of said tubes, pressure is exerted against said keys 13, forcing them radially inwardly against wrapped mandrel 11. Assuming equal frictional forces, it can be seen that the pressure exerted against said mandrel by each key will be substantially equal, and each of said keys will be equally responsive to regulation via a master pressure control valve. Said pressure need only be sufficient to provide intimate contact of the contiguous layers of wrapped fabric. Approximately 15 pounds per square inch on the wrapped mandrel has worked satisfactorily.

Each tube 23 is closed at one extremity by a plug 29 secured in the housing by a suitable nut. The opposite extremity of each tube telescopically receives the extremity of a hose coupling 31 held in the housing by a suitable nut. A hose from the air pressure source and master pressure control valve (not shown) delivers air under pressure to each tube 23 through hose coupling 31. Although control of the extent of travel of the keys 13 by very accurate control of the pressure means would assure equal radial inward travel of said keys against wrapped mandrel 11, such travel can most satisfactorily be regulated by stops 25. A plurality of such stops are preferably equally spaced along a longitudinal side of each pressure key 13, Figure 3. Thus, as each key 13 travels inwardly against wrapped mandrel 11, stops 25 are located so as to prevent further inward movement when said keys reach a position which will form an octagonal form having all sides equal and undistorted.

As can be seen in Figures 1 and 5, said stops prevent an undesirable overtravel of keys 13 by coming into contact with the side of the next adjacent key, at which point further movement is prevented. The shape of stops 25 is not critical, but need only be designed so as to bear against the side of an adjacent key at the desired point of innermost travel of key 13.

The central bore 33 formed in the assembled housing 17 is of a shape and size sufficient to house the wrapped mandrel 11 and the pressure keys 13, and also provide venting or degassing passages 27 for the escape of gases during the cure. Of course, such venting is unnecessary when resins are utilized which give off little or no gases upon curing.

In order to allow easier separation of the keys 13 from the wrapped mandrel 11, said keys are preferably coated with a parting agent, as was described previously for the mandrel when it is desired that the mandrel be removed after cure.

If the mandrel core is to be removed, it can be readily pulled or knocked out after curing when a suitable parting agent has been employed.

The flash line, or excess resin "squeeze-out," that may be present on the cured rod, located at the juncture of the pressure keys 13, may be readily sanded down to give the completed object a smooth and finished appearance.

It is to be understood that the form of the invention herewith shown and described is to be taken as a preferred example of the same and that various changes in shape, size, and arrangement of parts may be resorted to without departing from the spirit of the invention or the scope of the annexed claims.

We claim:

1. In a fixture for curing bodies composed of convolutely wrapped layers of fibrous material reinforced with a resinous binder the combination of: a plurality of radially spaced movable elements, a housing supporting and guiding said elements, and pressure transmitting means applying equal pressure to each of said elements urging them towards one another.

2. In a fixture for curing bodies composed of convolutely wrapped layers of fibrous material reinforced with a resinous binder the combination of: a housing having a plurality of radial slots therein, movable elements in each of said slots supported and guided by said slots, and pressure transmitting means applying equal pressure to each of said elements urging same radially towards one another.

3. In a fixture for curing bodies composed of convolutely wrapped layers of fibrous material reinforced with a resinous binder the combination of: a housing having a plurality of radial slots therein, movable elements in each of said slots supported and guided by said slots, and pressure transmitting means applying equal pressure to each of said elements urging same radially towards one another and stop means preventing overtravel of said elements.

4. In a fixture for curing bodies composed of convolutely wrapped layers of fibrous material reinforced with a resinous binder the combination of: a housing having a plurality of radial slots therein, movable elements in each of said slots supported and guided by said slots, and pressure transmitting means applying equal pressure to each of said elements urging same radially towards one another, and means forming gas passages in said housing.

5. In a fixture for curing a body composed of layers of fibrous material convolutely wrapped around a mandrel and reinforced with a resinous binder the combination of: a housing having a central bore receiving said wrapped mandrel and having a plurality of radially extending slots in said housing communicating with said bore, movable elements inserted into and guided by said slots, and pressure transmitting elements in said slots applying equal pressure to each of said elements urging them radially inward into contact with said wrapped mandrel.

6. In a fixture for curing a body composed of layers of fibrous material convolutely wrapped around a mandrel and reinforced with a resinous binder the combination of: a housing having a central bore receiving said wrapped mandrel and having a plurality of radially extending slots in said housing communicating with said bore, movable elements inserted into and guided by said slots, and pressure transmitting elements in said slots applying equal pressure to each of said elements urging them radially inward into contact with said wrapped mandrel, said housing having gas passages communicating with said central bore.

7. In a fixture for curing a body composed of layers of fibrous material convolutely wrapped around a mandrel and reinforced with a resinous binder the combination of: a housing having a central bore receiving said wrapped mandrel and having a plurality of radially extending slots in said housing communicating with said bore, movable elements inserted into and guided by said slots, pressure transmitting elements in said slots applying equal pressure to each of said elements urging them radially inward into contact with said wrapped mandrel and stop means preventing overtravel of said elements.

8. In a fixture for curing a body composed of layers of fibrous material convolutely wrapped around a mandrel, and reinforced with a resinous binder the combination of: a housing having a central bore receiving said wrapped mandrel and having a plurality of radially extending slots in said housing communicating with said bore, movable elements inserted into and guided by said slots, pressure transmitting elements in said slots applying equal pressure to each of said elements urging them radially inward into contact with said wrapped mandrel, said housing having gas passages communicating with said central bore, and stop means preventing overtravel of said elements.

References Cited in the file of this patent

UNITED STATES PATENTS

| | | |
|---|---|---|
| 2,009,265 | Hirschfield | July 23, 1935 |
| 2,446,038 | Amigo | July 27, 1948 |
| 2,572,924 | Gonda | Oct. 30, 1951 |
| 2,603,579 | Kramer | July 15, 1952 |
| 2,643,700 | Havens | June 30, 1953 |